United States Patent [19]

Crompton et al.

[11] Patent Number: 5,566,424
[45] Date of Patent: Oct. 22, 1996

[54] TILT ADJUSTMENT MECHANISM

[75] Inventors: Dennis Crompton, Apex; Richard H. Harris, Raleigh; Herbert G. Leonard, Lousiburg; George Hufford, III, Clayton; Jeff D. Thomas, Raleigh, all of N.C.

[73] Assignee: International Business Machines Corporation, Armonk, N.Y.

[21] Appl. No.: 436,941

[22] Filed: May 8, 1995

[51] Int. Cl.$^6$ ............................... E05D 7/00; E05C 17/64
[52] U.S. Cl. ............................ 16/342; 16/337; 16/347; 16/354; 192/8 C; 192/41.5
[58] Field of Search ........................ 16/342, 337, 354, 16/347; 192/8 C, 41.5, 56.2

[56] References Cited

U.S. PATENT DOCUMENTS

| | | | |
|---|---|---|---|
| 4,372,432 | 2/1983 | Waine et al. | 192/8 C |
| 4,433,765 | 2/1984 | Rude et al. | 192/56.2 |
| 5,064,137 | 11/1991 | Komatsu | 192/415 |
| 5,081,742 | 1/1992 | Kobayashi | 16/337 |
| 5,102,084 | 4/1992 | Park | 16/354 |
| 5,165,509 | 11/1992 | Kanno et al. | 16/342 |
| 5,195,213 | 3/1993 | Ohgami et al. | 16/342 |
| 5,197,704 | 3/1993 | Kitamura | 16/342 |
| 5,231,734 | 8/1993 | Rude | 16/342 |

*Primary Examiner*—M. Rachuba
*Assistant Examiner*—Adesh Bhargava
*Attorney, Agent, or Firm*—John D. Flynn

[57] ABSTRACT

A tilt adjustment mechanism having an upper housing, a lower housing and a shaft assembly is disclosed. The shaft assembly receives the gears which are pressed on either end of shaft. The shaft fits through locating slots in the lower housing. Each of the gears are activated by internal gears located on each side of the upper housing. The internal gears are integrally formed with the upper housing. The upper housing is hinged on the lower housing and can rotate 20 degrees. The shaft assembly mechanism provides a torsion bar function to insure that the upper housing moves evenly with respect to the lower housing. Even motion in the upwards and downwards directions of the housing is provided by even rotational torsional motion and opposite rotational torsional motion of the shaft assembly of the tilt adjustment mechanism. The shaft assembly mechanism decouples the frictional load in the two different rotational directions about its shaft. This permits the adjustment of the forces to optimal levels in both directions. A relatively high force is desired to move the upper housing in a downward direction. This prevents the operator's touches on a display tablet, mounted to the upper housing to cause the tilt adjustment mechanism to move in the downward direction. A relatively low force is required to move the tilt adjustment mechanism in the upwards direction.

12 Claims, 17 Drawing Sheets

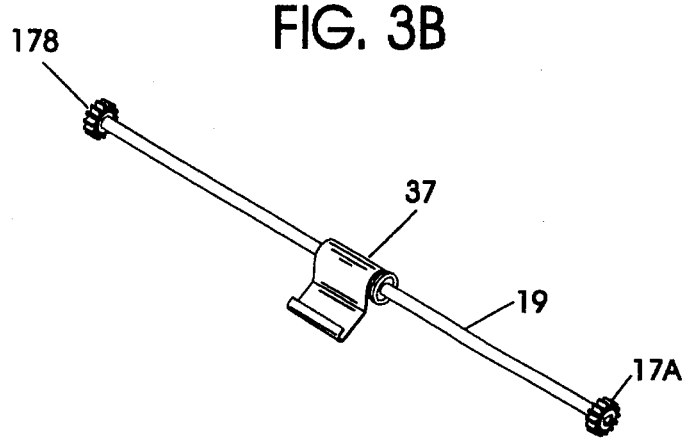
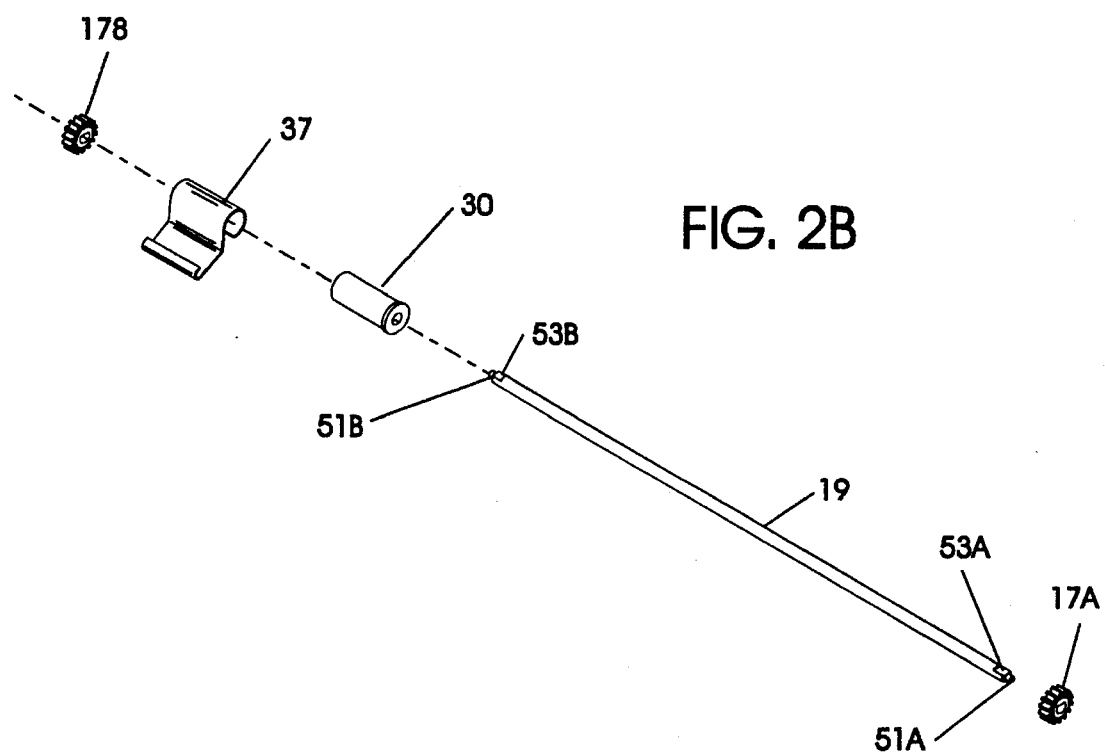

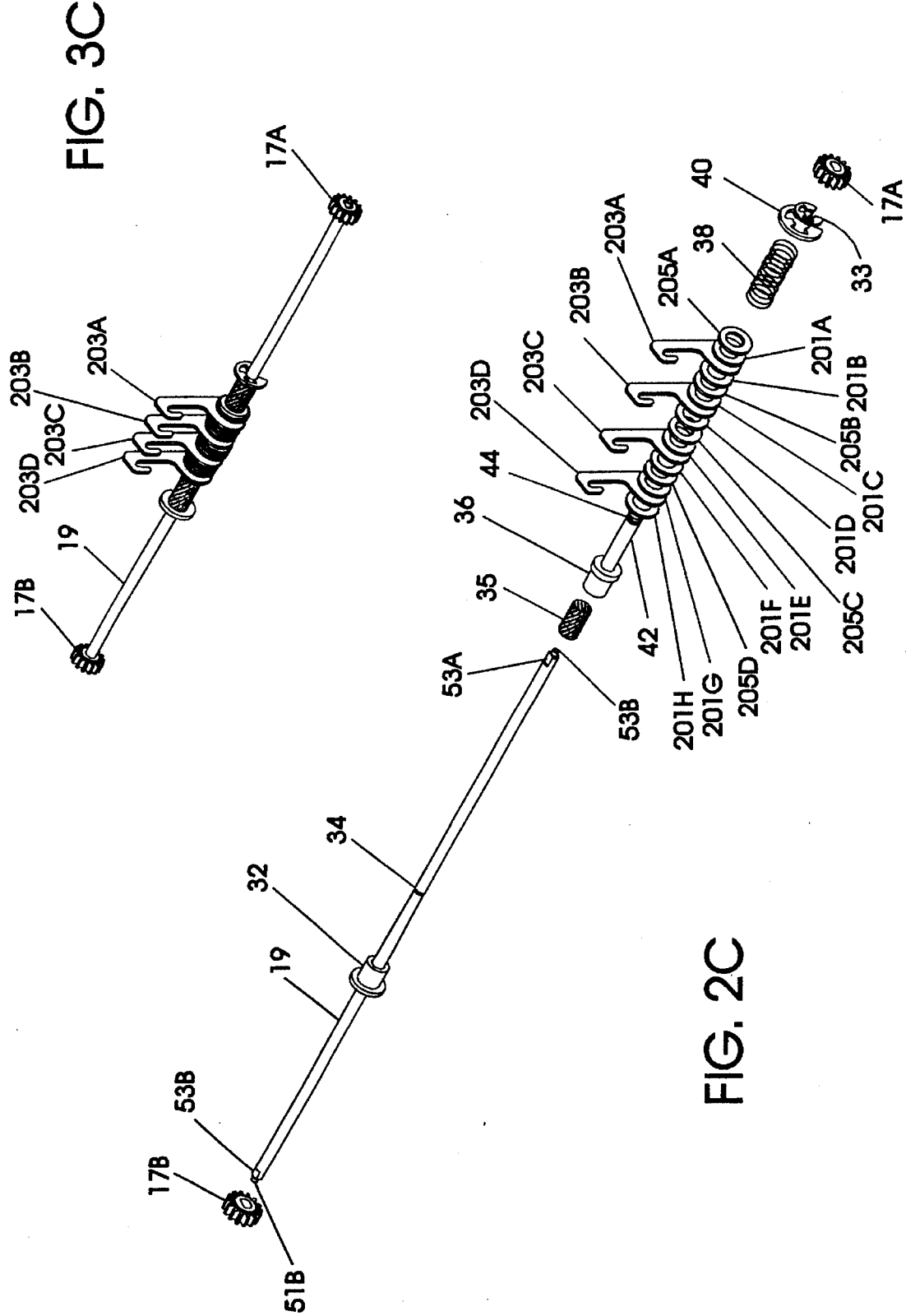

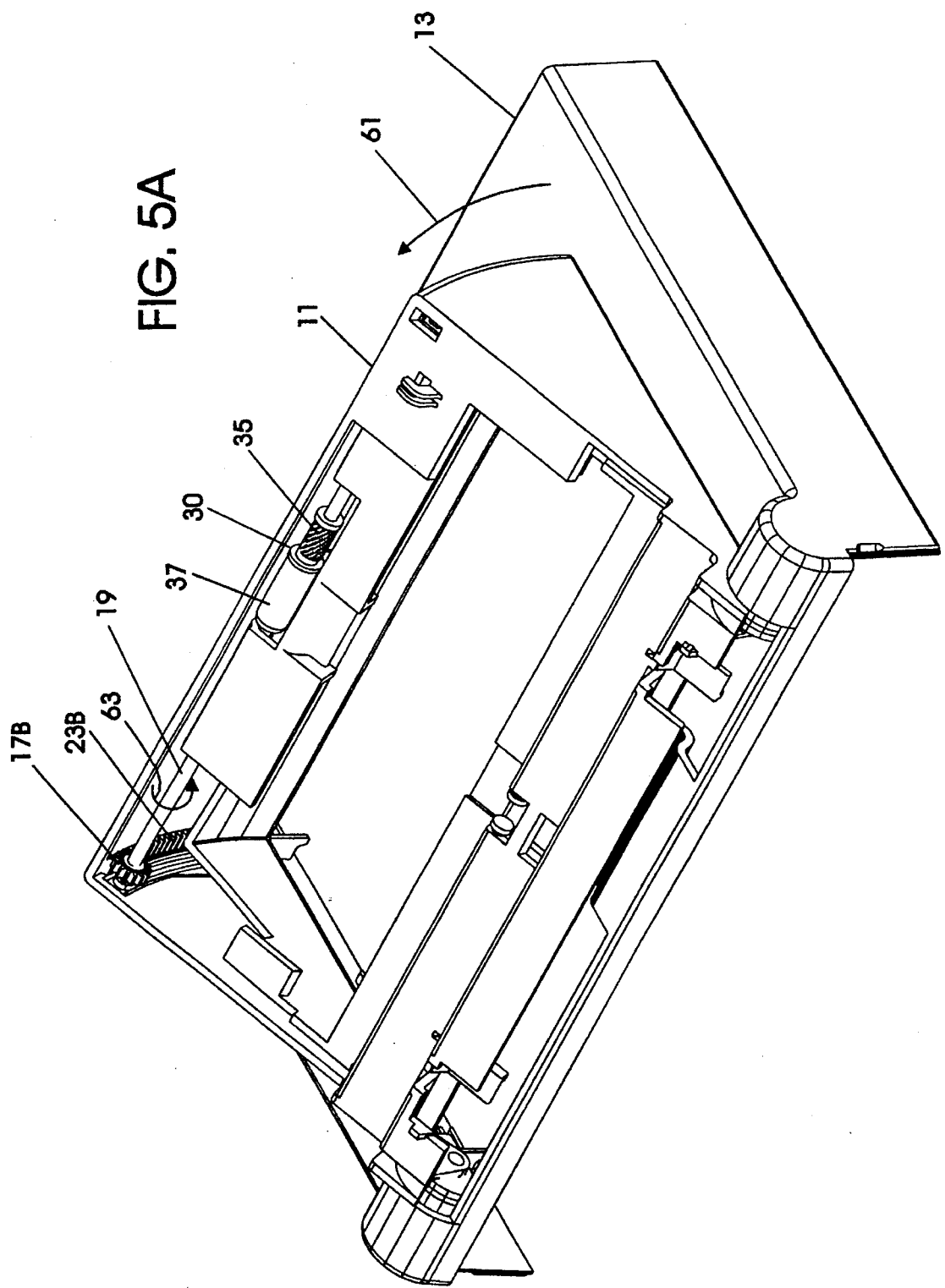

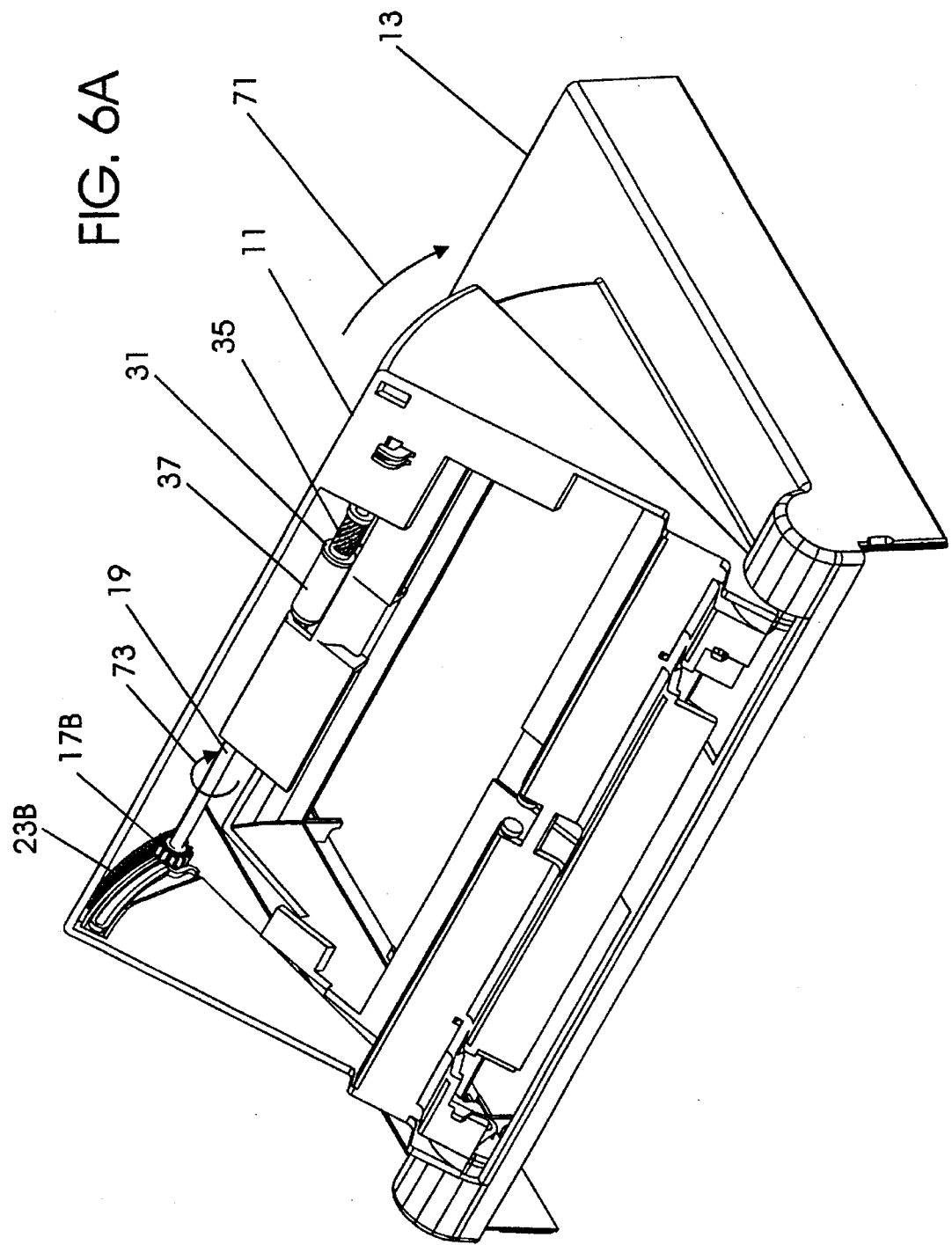

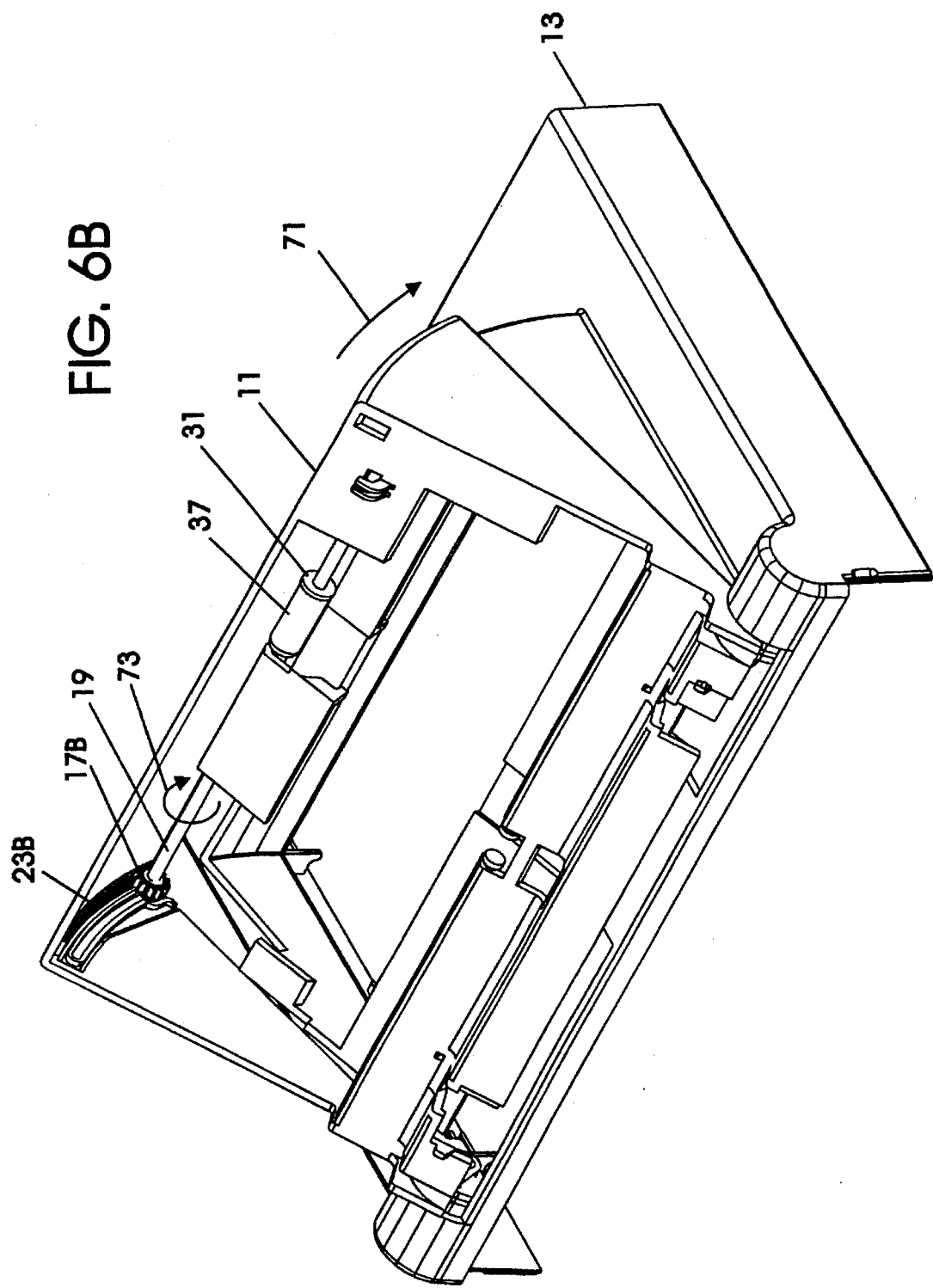

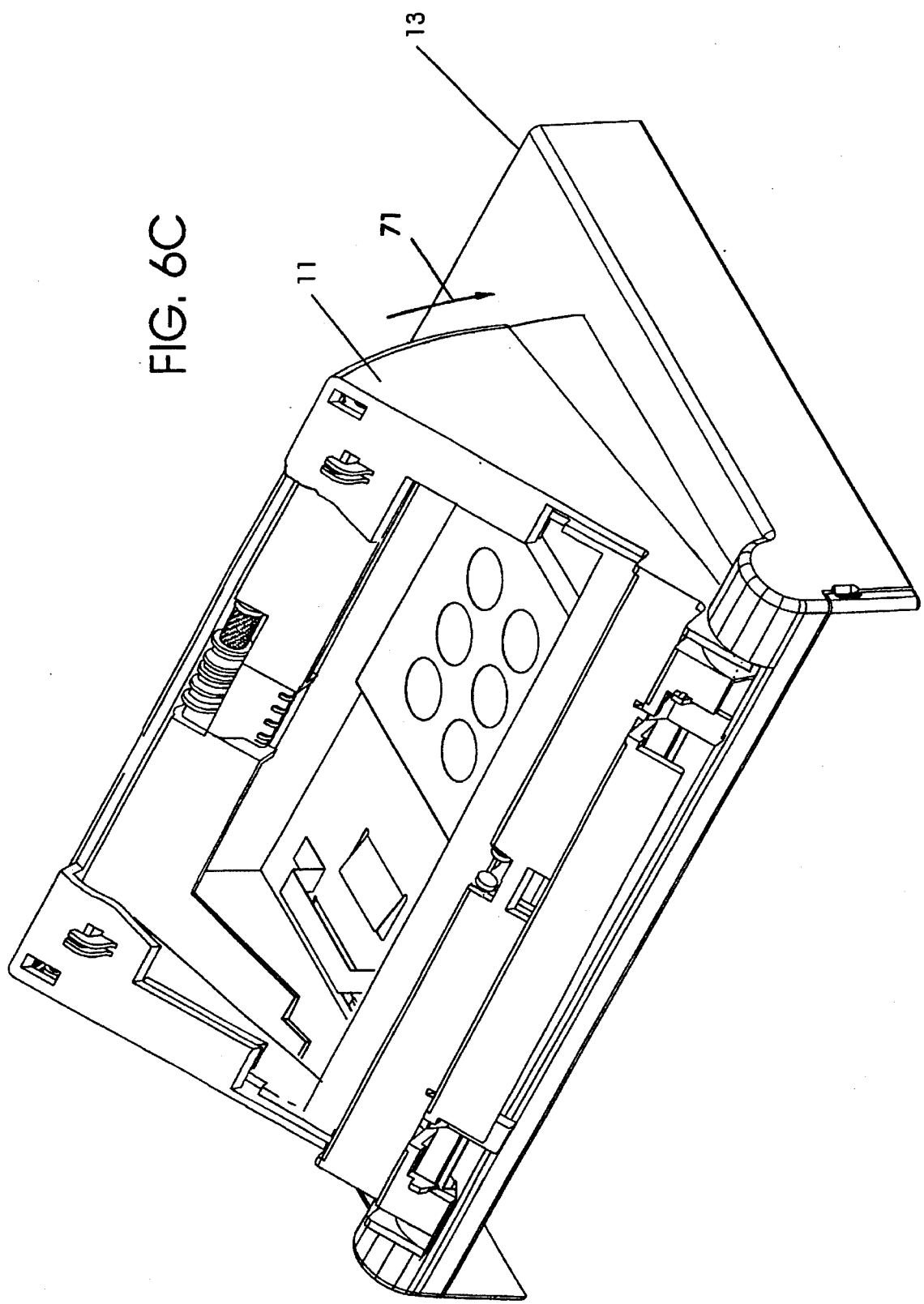

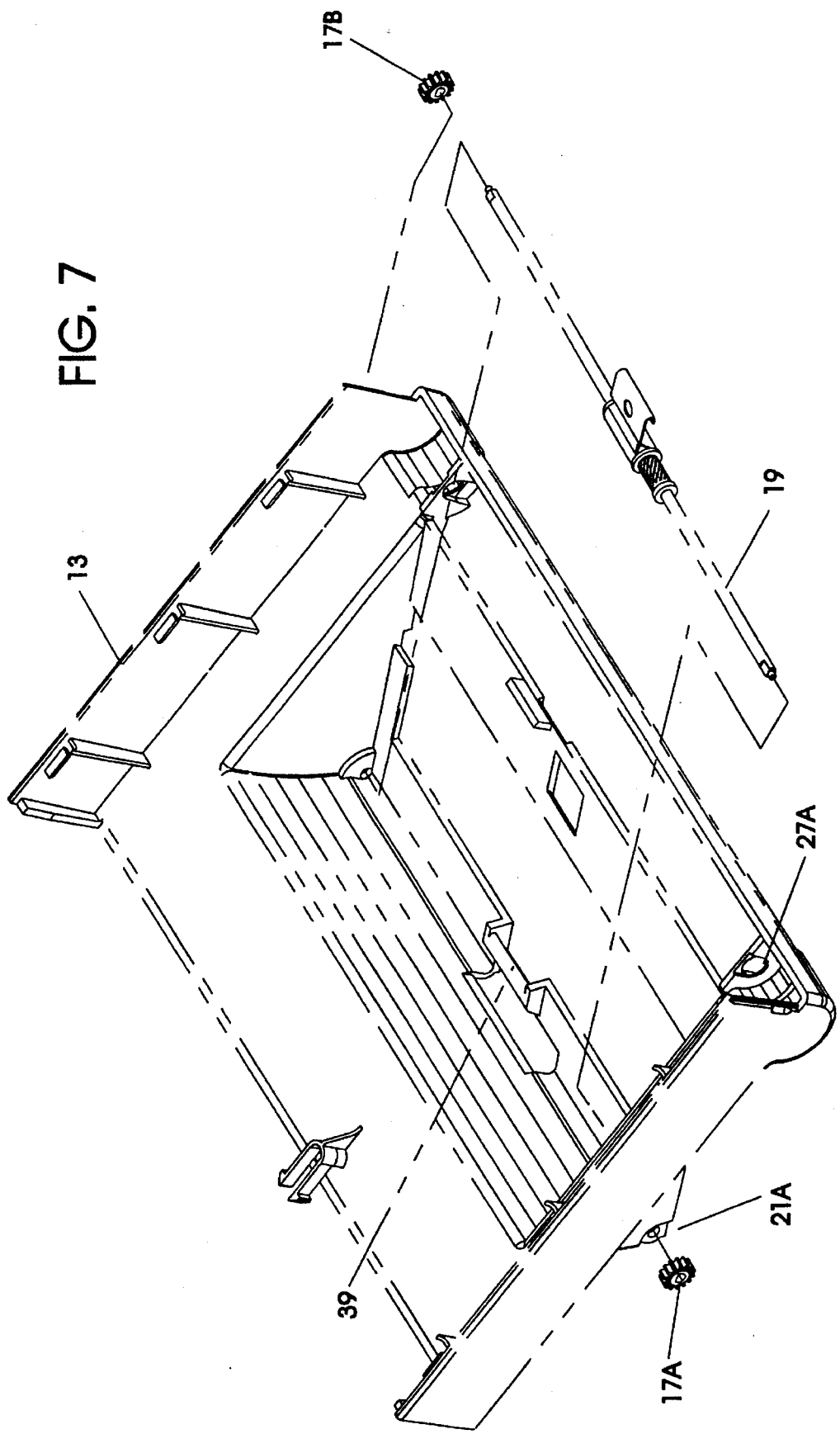

TILT ADJUSTMENT MECHANISM

BACKGROUND OF THE INVENTION

1. Field of the Invention

The present invention relates generally to a tilt adjustment mechanism for a display tablet and in particularly to a tilt adjustment mechanism for use in connection with a touch screen display tablet.

2. Related Applications

This application is related to co-pending application Ser. No. 08/437,008 entitled "A Front Cover Assembly for a Touch Sensitive Device" IBM Docket number RA9-95-015 filed 8 May 1995 hereby incorporated by reference.

This application is related to co-pending application Ser. No. 08/436,953 entitled "A Shaft Assembly for a Tilt Adjustment Mechanism" IBM Docket number RA9-95-043 filed 8 May 1995 hereby incorporated by reference.

DESCRIPTION OF THE PRIOR ART

In order to provide for varying requirements and suitable glare resistance, touch displays must be rotated up and down within a certain range. This tilt adjustment helps compensate for operator height variations and ambient glare on the glass of the display surface. The touch display requires the use of touch for operator input so the tablet must withstand a touch force without moving. It is also desired that the touch display be adjustable with one hand without any releases or buttons. It is further desired that infinite adjustment be available within the range of motion. Since the touch display unit is not heavy, it is also desired to be able to adjust the tablet upward with one hand without lifting the unit off the counter.

There are several prior art techniques that solve some of the above requirements. One such technique is a hinge; however, a number of prior art hinges have various disadvantages. Some prior art hinges leave a large amount of free play before any resistance is felt by the user. Other hinges allow rotational movement of the members only in discrete steps through the use of a ratchet-type mechanism or a detent. Therefore, if the optimal viewing angle for a particular operator is between two discrete ratchet steps the operator much choose a position which is not optimal. A ratchet mechanism limits the adjustment to certain discreet points and would probably require release buttons. An unlock/adjust/lock mechanism could be employed but requires the use of release/lock buttons which can be difficult to maneuver with one hand. A friction device could be employed but is difficult to adjust upward without using one hand to pull upward and one hand to hold the system unit down. A friction device also provides the same resistance in the upward and downward directions. Another problem with these solutions is that the housing of the display tablet and system unit is plastic and flexible. Pushing or pulling on one corner of the tablet can cause the tablet to twist. This twisting action can cause the unit to adjust unevenly and cause damage to the tablet.

SUMMARY OF THE INVENTION

It is an object of the present invention to provide a tilt adjustment mechanism that provides for a smooth, infinite adjustment within a given range of movement.

It is a further object of the present invention to provide a tilt adjustment mechanism that provides for an adjustment force different in upward versus the downward direction.

It is still a further object of the present invention to provide a tilt adjustment mechanism that provides for one handed operation.

It is still a further object of the present invention to provide a tilt adjustment mechanism that does not require the use of release buttons to adjust.

It is still a further object of the present invention to provide a tilt adjustment mechanism that is compact.

It is still a further object of the present invention to provide a tilt adjustment mechanism that does not cause twisting when in use.

It is still a further object of the present invention to provide a tilt adjustment mechanism that operates evenly.

It is still a further object of the present invention to provide a tilt adjustment mechanism which is simple in construction, low in manufacturing cost and compact in size.

In accordance with a preferred embodiment of the present invention, a tilt adjustment mechanism having an upper housing, a lower housing and a shaft assembly. The shaft assembly receives the gears which are pressed on to either end of shaft. The shaft fits through locating slots in the lower housing. Each of the gears are activated by internal gears located on each side of the upper housing. The internal gears are integrally formed with the upper housing. The upper housing is hinged on the lower housing and can rotate 20 degrees. The shaft assembly mechanism provides a torsion bar function to insure that the upper housing moves evenly with respect to the lower housing. Even motion in the upwards and downwards direction of the housing is provided by even rotational torsional motion and opposite rotational torsional motion of the shaft assembly of the tilt adjustment mechanism. The shaft assembly mechanism decouples the frictional load in the two different rotational directions about its shaft. This permits the adjustment of the forces to optimal levels in both directions. A relatively high force is desired to move the upper housing in a downward direction. This prevents the operator's touches on a display tablet, mounted to the upper housing to cause the tilt adjustment mechanism to move in the downward direction. A relatively low force is required to move the tilt adjustment mechanism in the upwards direction.

BRIEF DESCRIPTION OF THE DRAWINGS

The foregoing and other objects, aspects and advantages of the invention will be better understood from the following detailed description with reference to the drawings, in which:

FIG. 2(b) shows exploded view of a shaft assembly having a one-way bearing clutch spring clip bushing shaft assembly.

FIG. 2(c) shows exploded view of a shaft assembly having a spring clutch cork washer bushing shaft assembly.

FIG. 3(b) shows view of a shaft assembly having a one-way bearing clutch spring clip bushing shaft assembly.

FIG. 3(c) shows view of a shaft assembly having a spring clutch cork washer bushing shaft assembly.

FIG. 5(a) shows the tilt adjustment mechanism in the full down position with a spring clutch spring clip bushing shaft assembly.

FIG. 6(a) shows the tilt adjustment mechanism in the full up position with a spring clutch spring clip bushing shaft assembly.

FIG. 6(b) shows the tilt adjustment mechanism in the full up position with a one-way bearing clutch spring clip bushing shaft assembly.

FIG. 6(c) shows the tilt adjustment mechanism in the full up position with a spring clutch cork washer bushing shaft assembly.

FIG. 7 demonstrates assembly of the shaft assembly to the lower housing.

DETAILED DESCRIPTION OF THE INVENTION

The present invention provides a tilt adjustment mechanism that can be adjusted by an operator with one hand, can be adjusted upward with minimal force yet requires greater than a predetermined force to adjust downward. The tilt adjustment mechanism also prevents twisting of the tilt adjustment mechanism as well as devices attached to the tilt adjustment mechanism. The tilt adjustment mechanism is infinitely adjustable within a certain range. In the preferred embodiment a 20 degree range of adjustment is provided for improving the usability of the touch display. Also in the preferred embodiment the tilt adjustment mechanism must with stand a 5 lb touch force without moving in the downward direction.

Figure 1:
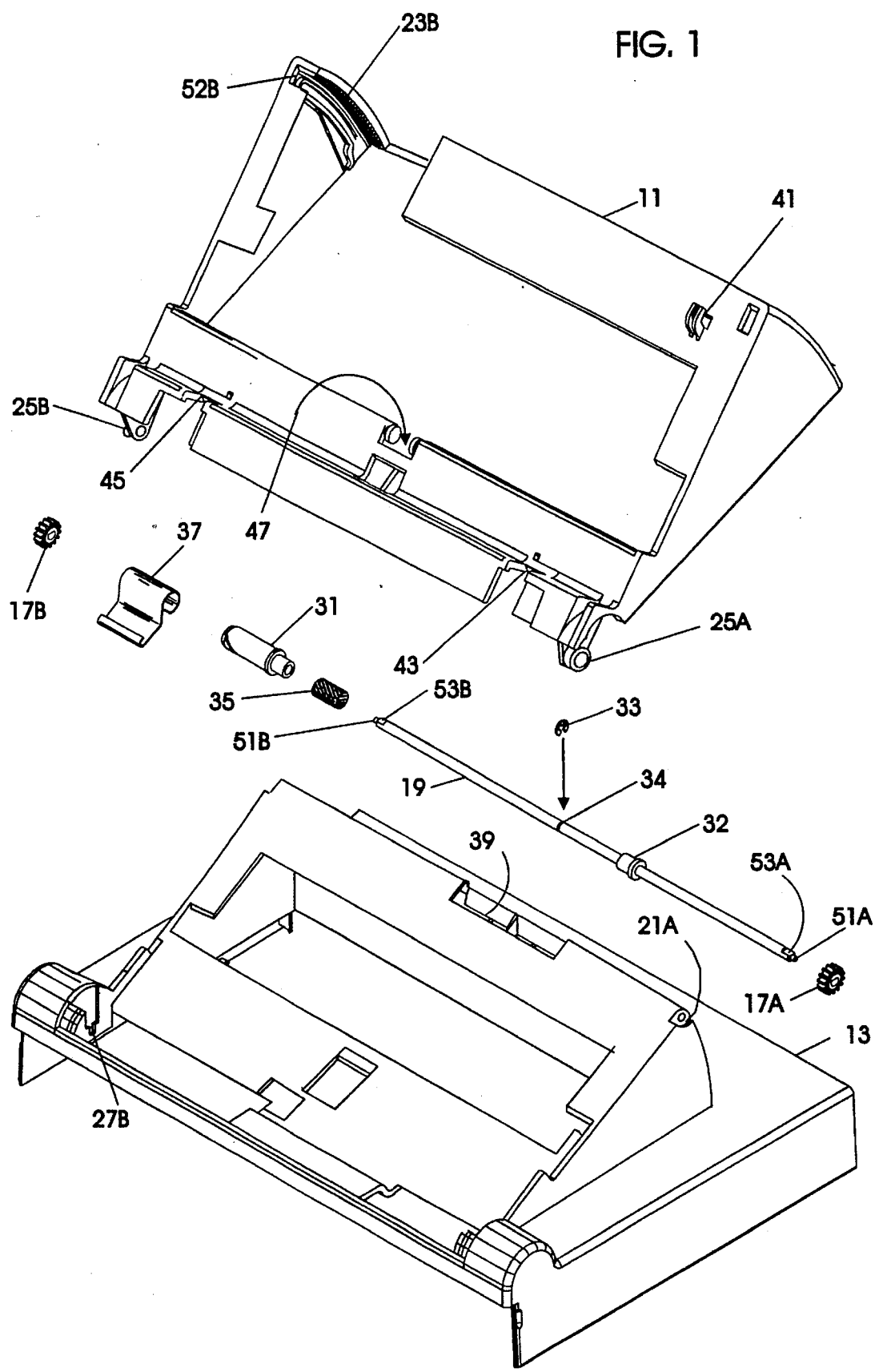
FIG. 1 is an exploded view of the tilt adjustment mechanism showing the upper housing, the lower housing and the shaft assembly.

The present invention consists of the mechanism as shown in an exploded view in FIG. 1. The tilt adjustment mechanism consists of an upper housing 11, a lower housing 13 and a shaft assembly 15. The shaft assembly receives the gears (17A, 17B) which are pressed on to either end of shaft (19). The shaft fits through locating slots (21A, 21B not shown) in the lower housing 13. Each of the gears (17A, 17B) are activated by internal gears (23A not shown, 23B) located on each side of the upper housing 11. The internal gears (23A, 23B) are integrally formed with the upper housing. The upper housing 11 is hinged on the lower housing 13 and in the embodiment shown can rotate 20 degrees. The hinge is provided by hinge posts (25A, 25B) on the upper housing 11 and hinge post receptacles (27A not shown, 27B) on the lower housing 13. Other hinge embodiments may also be utilized in accordance with the present invention.

The lower housing 11, upper housing 13 are preferable made of flexible plastic material by an injection molding technique. The gears are preferably made of a strong and/or stiff plastic material also using injection molding techniques. Although any material that is strong and/or stiff may be utilized, in the preferred embodiment glass or Teflon filled plastic is used. Note the wedge shaped housings wherein the upper housing 11 fits over the lower housing 13. The upper housing 11 rotates about said lower housing 13 about said hinge using the internal gears (23A, 23B) and the gears (17A, 17B) and the shaft assembly.

The shaft assembly mechanism provides a torsion bar function to insure that the upper housing moves evenly with respect to the lower housing. Even motion in the upwards and downwards direction of the housing is provided by an even rotational (i.e., clockwise) torsional motion and an opposite rotational (i.e., counterclockwise) torsional motion of the shaft assembly of the tilt adjustment mechanism. The shaft assembly mechanism decouples the frictional load in the two different rotational directions about its shaft 19. This permits the adjustment of the forces to optimal levels in both directions. A relatively high force is desired to move the upper housing in a downward direction. This prevents the operator's touches on the touch screen display or display tablet, mounted to the upper assembly as shown in FIG. 9, for data input purposes to cause the tilt adjustment mechanism and thus the touch display to move in the downward direction. A force of approximately 5 lbs should be necessary to cause the display to move in the downward direction. A relatively low force is required to move the tilt adjustment mechanism in the upwards direction. These forces may be changed by changing the spring force, bushing diameter, and/or coefficient of friction between the various parts of the shaft assembly as discussed below for the various shaft assembly embodiments.

The shaft 19 is preferably made of stainless steel. Note that in the preferred embodiment the ends of the shaft have a smaller diameter than the main body of the shaft. Each of the smaller diameter ends (51A, 51B) may travel in the guides (52A, 52B) in the upper housing 11 which provides additional torsional stability as well as keeping the gears (17A, 17B) aligned on the internal gears (23A, 23B). The guides (52A, 52B) may also be designed to facilitate assembly of the tilt adjustment mechanism by providing an assembly path for the shaft assembly. Also note the flats (53A, 53B) are present for mating the gears (17A, 17B) to the shaft 19. The gears (17A, 17B) have receptacles for receiving the flat portions of the shaft (53A, 53B). The gears (17A, 17B) are thus mechanically locked to the shaft 19 and rotate along with the shaft 19 when the shaft 19 rotates. The gears (17A, 17B) when activated by the internal gears (52A, 52B) with an appropriate force cause the shaft 19 to turn.

Spring Clutch Spring Clip Bushing Shaft Assembly

Figure 3A:
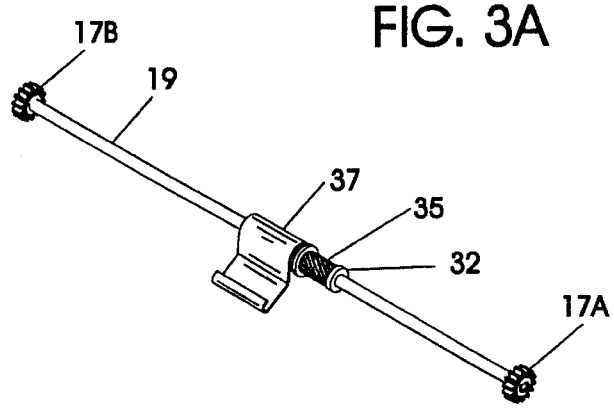
FIG. 3(a) shows view of a shaft assembly having a spring clutch spring clip bushing shaft assembly.
Figure 2A:
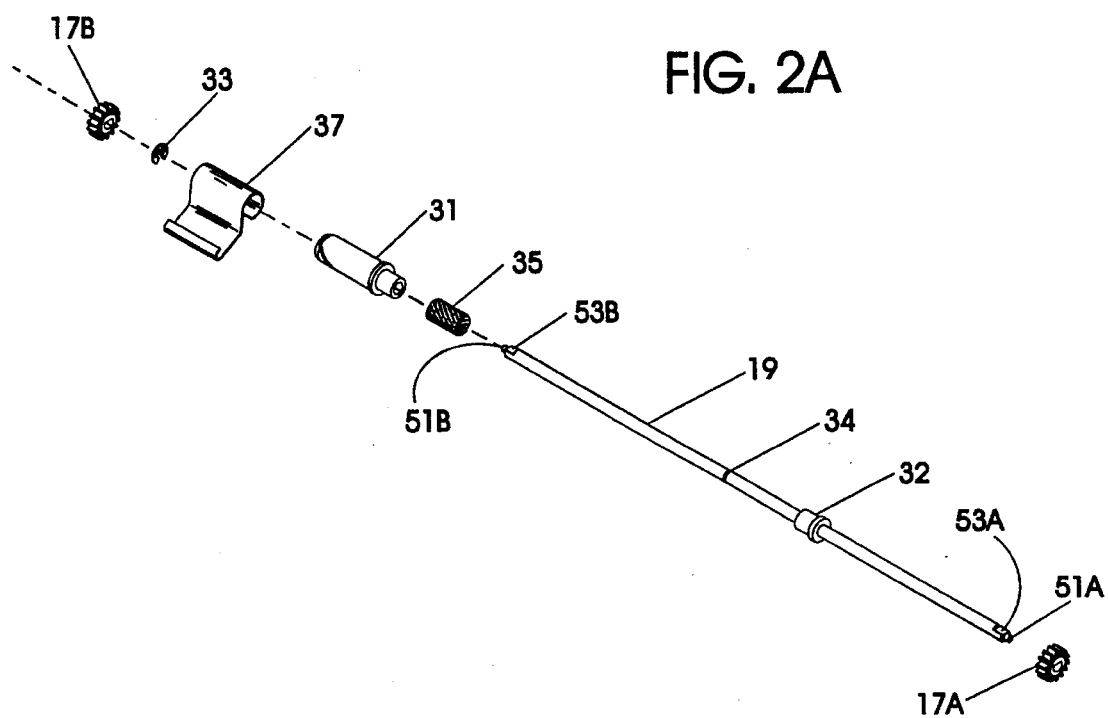
FIG. 2(a) shows exploded view of a shaft assembly having a spring clutch spring clip bushing shaft assembly.

In the embodiment shown in FIG. 1, and also exploded in FIG. 2(a), and shown assembled in FIG. 3(a), the shaft assembly mechanism has a bushing 31 and spring clutch 35 that slips onto the shaft 19 and is held in position by a c-clip 33 and end clip 32. Note the c-clip notch 34 for preventing the c-clip from moving along the shaft 19 when the shaft assembly mechanism is in operation. End clip 32 rotates with the shaft 19. The end clip 32 may be integral molded as part of the shaft 19 or crimped or shrink wrapped or welded to the shaft 19. The spring clutch 35 slips over a portion of the end clip 32 and buttresses against the shoulder of the end clip 32. The end clip 32 has a mating surface for receiving the spring clutch 35. The bushing 31 is provided with a mating surface to receive the spring clutch 35. In the preferred embodiment the mating surfaces are cylindrical shafts over which the spring clutch 35 fits such that when the shaft 19, and thus end clip 32, turns the spring clutch 35 wraps down or unwraps on the bushing 31 and end clip 32. When wrapped down the spring clutch 35 surfaces create a friction lock between said shaft 19, via end clip 32, and the bushing 31 causing the bushing 31 to rotate with the shaft 19. When the spring clutch 35 is unwrapped the shaft 19 turns freely with respect to the bushing 31. The bushing 31 may be made of any material such as a hard stiff plastic or steel. In the preferred embodiment a lubricated plastic such as carbon filled plastic or Teflon filled plastic is used for smoothness and wear. The bushing 31 has a contoured inner surface to provide for smooth rotation of the shaft 19 in one rotational direction (i.e., clockwise or where the upper housing is moved in the upwards direction) such that a unwrapping force is applied to the spring clutch 35 and when rotated in the other rotational direction (i.e., counterclockwise or where the upper housing is moved in the downwards direction) such that wrapping force is applied to the spring clutch 35. The bushing 31, spring clutch 35, end clip 32 provide a wrap spring action to mechanical lock the shaft 19 and bushing 31. The wrap down action causes the bushing 31 and spring clutch 35 to lock with the end clip 32 and thus rotate with the shaft 19. The bushing 31 is held in place on the shaft by the end clip 32 and c-clip 33 in c-clip notch 34.

When the bushing 31 is locked with the shaft 19 the force required to move the shaft 19 and bushing in the rotational direction when the spring clutch 35 wraps down, is the force required to overcome the frictional forces between the bushing 31 and the spring clip 37. The spring clip 37 slips over a portion of the bushing 31 to provide a friction load. The spring clip 37 is held in place by the lower housing 13 to prevent rotation of the spring clip 37 with the shaft 19 or bushing 31. The spring clip 37 has a clip or hook portion 45 designed to secure the clip to the lower housing 13 and prevent the spring clip 37 from rotating with the shaft 19 or bushing 31. The spring clip 37 is held in place by spring clip receptacle 39 in the lower housing 13. The spring clip 37 has a sleeve for receiving the bushing 31. The sleeve is mated to the bushing 31 such that the bushing will turn within the sleeve provided an appropriate force is applied. The spring clip 37 is preferable made of stainless steel. The force required to cause the shaft to rotate can be adjusted by adjusting the friction between the spring clip sleeve and the bushing. By increasing the friction, tightening the sleeve and bushing or increasing spring clip width in contact, a greater force is required to move the upper assembly in a downward direction. The force may also be adjusted by the selection of materials utilized for the sleeve and bushing by selecting materials with appropriate coefficients of friction. By decreasing the friction, loosening the sleeve and bushing or decreasing spring clip width in contact, less force is required to move the upper assembly in a downward direction. Thus, the force required to cause the shaft bushing assembly to rotate within the sleeve can be adjusted to the desired force level. Note the lip or shoulder on the outer surface of the bushing 31. This lip or lips may be used to aid in preventing the spring clip 37 from moving along the outer surface of the bushing 31.

One-Way Bearing Clutch Spring Clip Bushing Shaft Assembly

FIG. 2(*b*) depicts an alternative embodiment to the shaft assembly described above. In the embodiment shown in an exploded view in FIG. 2(*b*), and assembled in FIG. 3(*b*) the spring clutch 35, c-clip 33, c-clip notch 34 and the end clip 32 are eliminated. This results in less parts which reduces the cost of assembly. The embodiment shown in FIG. 2(*b*) consists of a spring clip 37 and a bushing bearing arrangement 30. The bushing bearing 30 permits the shaft to rotate with little or no resistance in one direction but causes the bush bearing 30 to lock on the shaft and rotate with the shaft when rotating the shaft in the opposite direction.

Figure 4A:
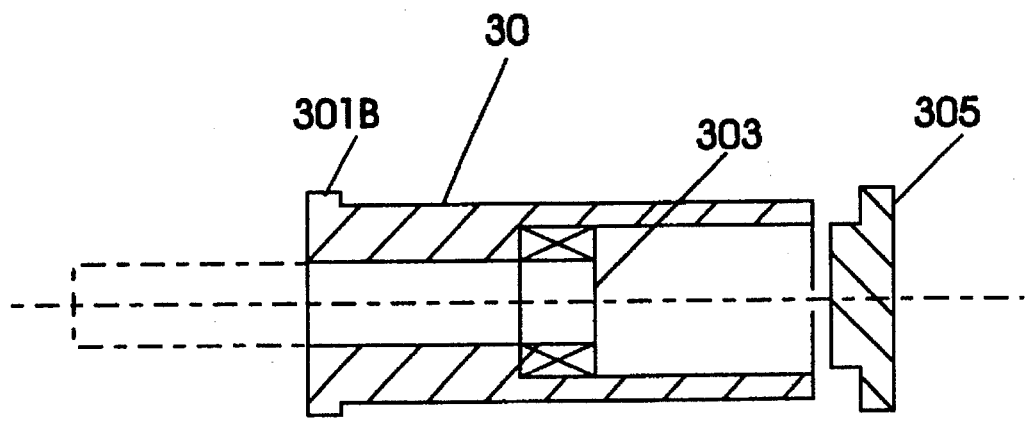
FIG. 4(a) is an a cut-a-way view of a cross section of the one-way bearing clutch bushing.
Figure 4B:
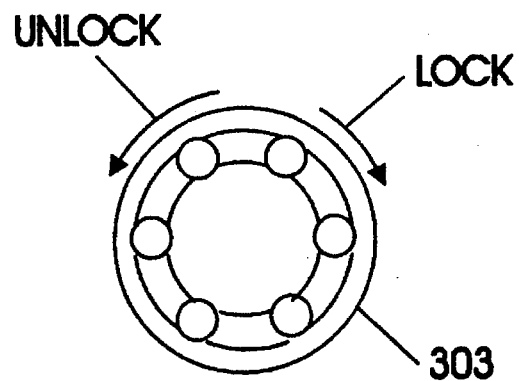
FIG. 4(b) is an a cut-a-way view of a cross section of the one-way bearing clutch bushing.

FIG. 4A shows a cut-a-way view of the bushing bearing 30. The bushing may be made of hard plastic having a contoured inner surface to provide for the bearing 303. The bushing bearing 30 provides for smooth rotation of the shaft 19 in one rotational direction (i.e., clockwise or where the upper housing is moved in the upwards direction) and a mechanical lock between the shaft 19 and bearings 303, and thus the bushing 30 when rotated in other rotational direction (i.e., counterclockwise or where the upper housing is moved in the downwards direction). FIG. 4B depicts a cut-a-way view of a bushing with a one-way bearing clutch 303. As shown in FIG. 4A the one-way bearing clutch 303 is pressed into the inside surface or wall of the bushing 30. The bearing 303 is comprised of a plurality of cylindrical rods seated in a plastic holder. Suitable bearings are commercially available from numerous vendors. An end cap 305 can be pressed into one end of the bushing 30 to contain the spring clip 37 and to provide additional support between the bushing 30 and shaft 19. The bushing 30 with the one way bearing clutch 303 can receive a shaft 19. Additional support for the shaft 19 may be provided by end cap 305. The one way bearing clutch 303 allows the shaft 19 to rotate freely in one direction but creates a mechanical lock between the shaft 19 and one way bearing clutch and thus the bushing 30 and end cap 305 when rotated in the opposite rotational direction. When the bushing 30 and bearing clutch 303 have locked with the shaft 19 the force required to move the shaft 19 in the locking rotational direction is the force required to overcome frictional forces between the bushing 30 and the spring clip 37.

A spring clip 37 slips over a portion of the bushing 30 to provide the friction load. The spring clip 37 operates in conjunction with bushing 30 in the same fashion as the spring clip described in spring clutch spring clip bushing shaft assembly. Also note the lips 301A on the bushing 30 and the end cap 305. These lips prevent the spring clip 37 from moving along the outer surface of the bushing 30.

Spring Clutch Cork Washer Bushing Shaft Assembly

FIG. 2(*c*) depicts another embodiment wherein the spring clip 37 is replace by a plurality of cork washers (201A, 201B, 201C, 201D, 201E, 201F, 201G, 201H), a plurality of drag arms (203A, 203B, 203C, 203D), a plurality of steel washers (205A, 205B, 205C, 205D). The items form a clip that can be used to attach to the lower housing as the spring clip 37 discussed above. Note that each drag arm contains a hook portion 207 for attaching to the lower housing. Note also that each the drag arms may have a tooth on the outer surface for facilitating alignment, so that a clip is formed by the hooks which is suitable for use with the spring clip receptacle 39 of the lower housing 13. An off-the-shelf compression spring 38 is used to compress the steel washers, cork washers, and drag arms together. In this embodiment of the shaft assembly a steel bushing 36 is used which has a shoulder to engage the spring clutch 35. Note spring clutch 35, end clip 32 and c-clip 33 and notch 34 perform as described above in the spring clutch spring clip shaft assembly.

The steel washers 205, cork washers 201 and drag arms 203 are placed on the shaft of the bushing 36 in a sequence: cork washer, drag arm, cork washer, steel washer then repeated for each drag arm assembly. Each drag arm 203 has a cork washer 201 on both sides side followed by either a steel washer 205, bushing shoulder, end clip on each cork washer 201. The embodiment shown in FIG. 2(c) uses 8 cork washers, 4 steel washers and 4 drag arms. The shaft of the bushing 36 contains a groove 42. The steel washers 205 each have a tooth that fits into the groove 42 on the shaft of the bushing 36. This causes the steel washers 205 to rotate with the bushing 36. The drag arms 203 are held in position on the lower housing 13 via the hooks on the ends of each drag arm 203, in much the same manner as the spring clip 37 was held in place in the shaft assembly embodiments described above. To prevent rotation of the drag arms 203 with the shaft 19 or bushing 36 they are held in place by spring clip receptacle 39 in the lower housing 13 via the drag arm hooks.

The compression spring 38 slips over the bushing 36 and is loaded against the last steel washer of the drag arm assemblies and then held in place by a standard c-clip 40. C-clip 40 is seated in a c-clip notch 44 on the bushing 36 surface. Note that the seated c-clip 40 in conjunction with the shoulder of bushing 36 and compression spring 38 causes the steel washers 205, cork washers 201 and drag arms 203 to be held together.

The bushing 36 has a contoured inner surface to provide for smooth rotation of the shaft 19 in one rotational direction (i.e., clockwise or where the upper housing is moved in the upwards direction) such that an unwrapping force is applied to the spring clutch 35 and when rotated in opposite rotational direction (i.e., counterclockwise or where the upper housing is moved in the downwards direction) such that a wrapping force is applied to the spring clutch 35. The bushing 36, spring clutch 35, end clip 32 and thus provide a wrap spring action to mechanical lock the shaft 19 and bushing 36. The wrapping force causes the bushing 36 and thus the steel washers 205 via the groove 42 in the bushing and teeth in the steel washers, to move with the shaft 19. The bushing 36 is held in place on the shaft 19 by end clip 32 and c-clip 40 seated in c-clip notch 34 on shaft 19. When the bushing 36 and spring clutch 35 have locked with the shaft 19 the force required to move the shaft 19 in the locking rotational direction is that force required to overcome the frictional forces between the drag arms 203 and the cork washers 201 and the steel washers 205.

The force required to cause the shaft to rotate can be adjusted by adjusting the friction between the steel washers 205 and cork washers 201 and drag arms 203. The frictional forces can be adjusted or set by controlling the surface areas (i.e., increasing the frictional surfaces) the materials (and thus the coefficients of friction) and by adjusting the spring force of the compression spring 38 (i.e., the k constant of the compression spring 38 or placement of the bushing c-clip 40 and bushing c-clip notch 44 to increase or decrease the compressive force). Note that the cork washers 201 will adhere to the surface that has the highest coefficient of friction or that the cork washers will move with respect to the surface that has the lowest coefficient of friction. That is the cork washers 201 will normally move with the steel washers 205 because they have a higher coefficient of friction than the plastic drag arms 203. However, if the drag arms were made of a material having a higher coefficient of friction then the steel washers the cork washers would not move with the steel washers as they turn with the bushing 36. By increasing the friction, increasing the diameters or tightening the compression spring 38 or increasing the thickness of the drag arm 203, a greater force is required to turn the shaft 19 in the friction loaded direction (i.e., move the upper assembly in a downward direction). By decreasing the friction, deceasing the diameters or loosening the compression spring 38 or decreasing the thickness of the drag arm 203, less force is required to move the upper assembly in the friction loaded direction (i.e., move the upper assembly in a downward direction). Thus, the force required to cause the shaft bushing assembly to rotate can be adjusted as desired In a tilt adjustment mechanism and when the upper housing is pulled upwards the shaft 19 an unwrapping force results on the spring clutch 35, allowing the shaft 19 to turn freely relative to the bushing 36. Thus, the upper housing moves easily upward. When the upper housing is pushed downward a wrapping force results in the spring clutch 35 locking the bushing 36, end clip 32 such that the bushing 36 and steel washers 205 rotate relative to the drag arms 203. The steel washers 205 turn with the bushing 36 which provides 8 different frictional surfaces. Two for each side of the steel washers 205. This provides for a high torque in a small diameter. The multiple surfaces provide additional torque by providing additional surface area without having to increase the diameter. The additional surface area also spreads the torque over multiple separate units such that if one unit becomes contaminated and the friction goes up or down the overall effect to the assembly is much less. Also in the event of a cork failure there is a compensating effect. If a cork washer breaks and falls out, the spring compression is reduced by the cork thickness and the lower spring force is spread across all the remaining friction surfaces. The final torque after a cork washer is dropped is not much different then the original torque. However, there may be some loss of the frictional consistency throughout the life of the bushing in that the frictional variations through life are more consistent with cork than with steel washer rubbing on the plastic drag arm.

The spring clutch cork washer bushing shaft assembly has advantages over the spring clutch spring clip bushing shaft assembly in that no custom spring is utilized as is the case with spring clip 37 in the embodiments described above. The cork washer embodiment provides a longer life over a plastic bushing spring arrangement and provides for smoother operation. The cork washers provide high torque using a small diameter with more consistent torque during life of the shaft assembly. The cork steel washer provides better resistance to contamination failures as well as the ability to compensate if one or more corks fail. The cork steel washer design consists of more parts and thus is more expensive to assemble but, the individual parts are less expensive.

Assembly of Tilt Adjustment Mechanism

Referring, now, to FIG. 7 the tilt adjustment mechanism is assembled by first placing the shaft assembly mechanism in the lower housing 13. The shaft assembly should have the bushing arrangement (i.e., spring clutch spring clip, one-way bearing clutch spring clip, spring clutch cork washer) already on the shaft 19. Assembly is performed by inserting one end of the shaft into one of the locating slots (21A, 21B). The shaft assembly should be inserted such that the clip portion of the spring clip (or drag arms) are able to grip the spring clip receptacle 39 of the lower housing 13. After one end of the shaft is placed on a locating slot (21A, 21B) the other end may be placed on the remaining slot. The spring clip (or drag arms) can then be attached to the spring clip receptacle 39 of the lower housing 13 to secure the bushing arrangement. Next the gears (17A, 17B) can be placed on the ends of the shaft protruding through the locating slots (21A, 21B). The upper housing 11 is then attached by means of the hinge posts (25A, 25B) on the upper housing 11 to the hinge receptacles (27A, 27B) of the lower housing 13. In the preferred embodiment the ends of the shaft 19 are placed within the guides (52A, 52B) in the upper housing 11. The internal gears (23A, 23B) are aligned with the gears (17A, 17B) and the upper housing 11 and upper housing 13 are snapped together and the tilt adjustment mechanism is ready for operation.

OPERATION OF THE TILT ADJUSTMENT MECHANISM

Figure 5B:
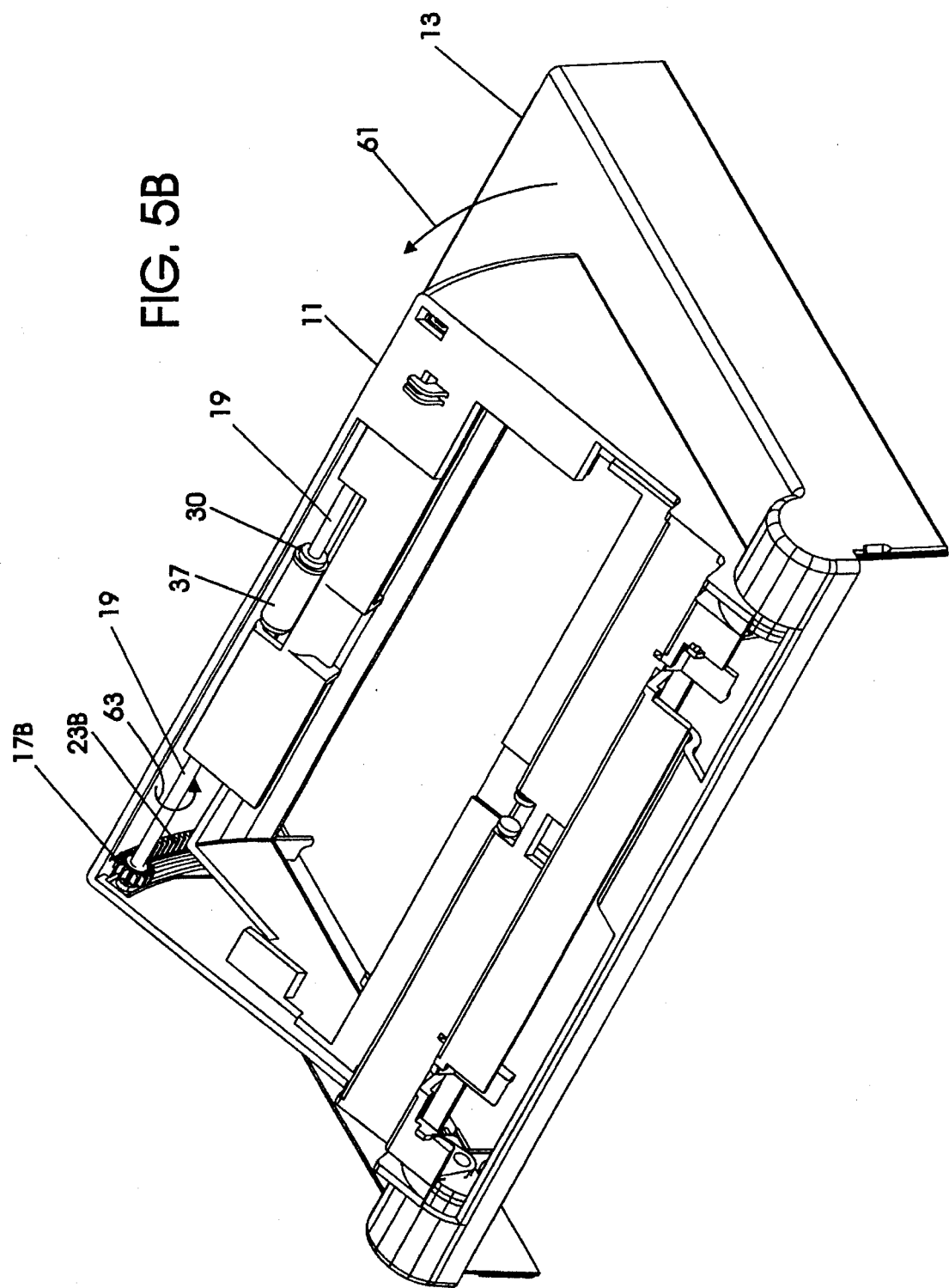
FIG. 5(b) shows the tilt adjustment mechanism in the full down position with a one-way bearing clutch spring clip bushing shaft assembly.
Figure 5C:
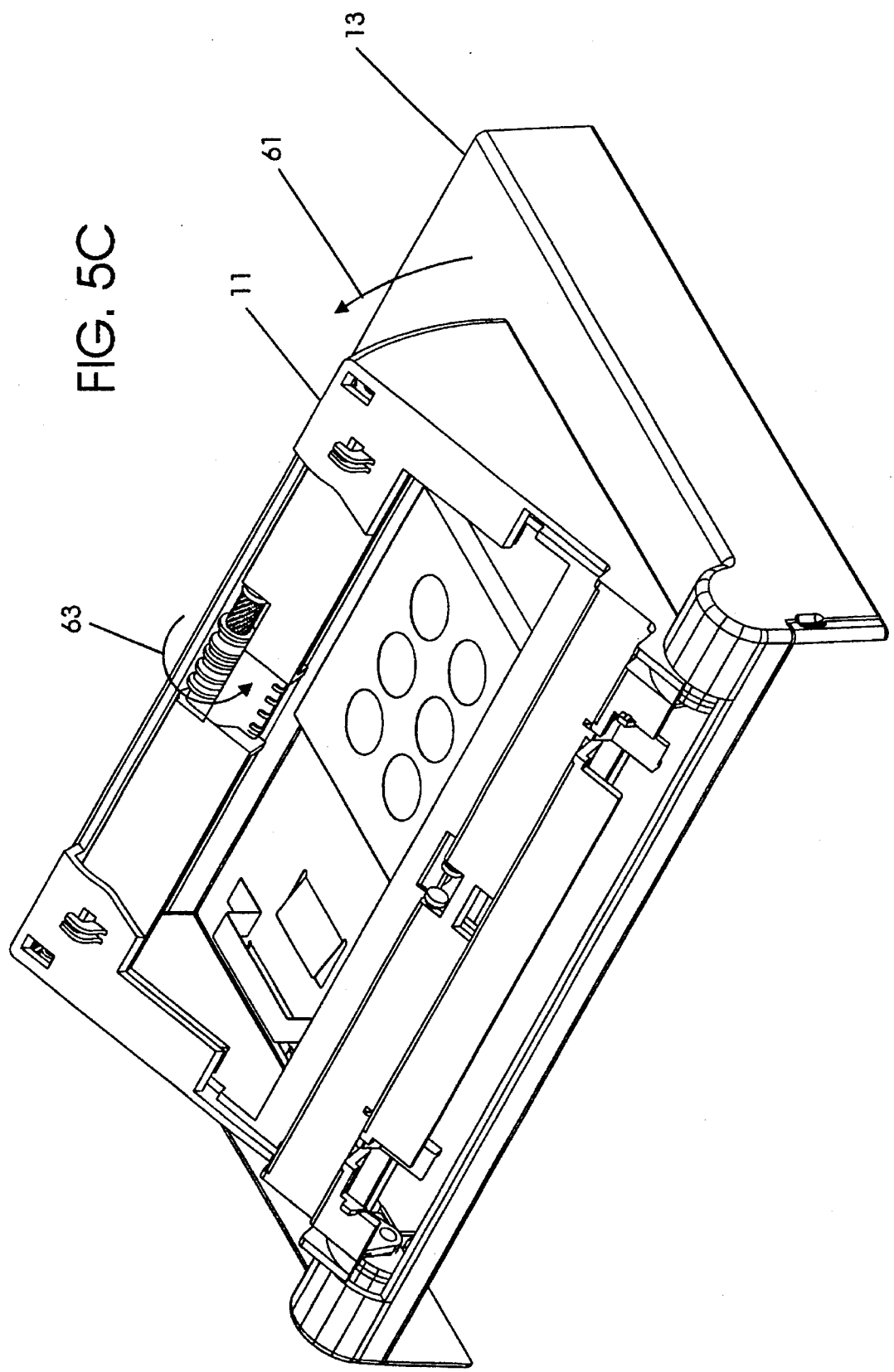
FIG. 5(c) shows the tilt adjustment mechanism in the full down position with a spring clutch cork washer bushing shaft assembly.

FIG. 5(a) shows the tilt adjustment mechanism with the upper housing 11 in the full down position with a spring clutch spring clip bushing. FIG. 5(b) shows the tilt adjustment mechanism with the upper housing 11 in the full down position with a one-way bearing clutch spring clip bushing. FIG. 5(c) shows the tilt adjustment mechanism with the upper housing 11 in the full down position with a spring clutch cork washer bushing. Operation will be described with respect to FIG. 5(a) but is also applicable to embodiments shown in FIG. 5(b) and FIG. 5(c) with the exception that the shaft assemblies operate as described above. A display tablet, not shown in FIG. 5, (see FIG. 8 and FIG. 9) mounts onto the upper housing 11 and can be pulled upward or pushed downward for adjustment. When the display tablet, or upper housing 11, is pulled upwards as indicated by direction arrow 61, the internal gears (23B, 23A) on the upper housing 11 activate the gears (17A, 17B) respectively and cause the shaft 19 to rotate as shown by direction arrow 63. The bushing is loaded to the lower housing 13 by the spring clip 37 but, the spring clutch 35 allows the shaft to spin relative to the bushing 31 with little or no load. This allows the display tablet to be adjusted upwards easily without lifting the system unit (not shown in FIG. 5 see FIG. 8–9). The upper housing 11 rotates about the hinges on the lower housing 13 causing the tablet to move upwards.

FIG. 6(a) shows the tilt adjustment mechanism with upper housing 11 in the full up or fully rotated position with a spring clutch spring clip bushing. FIG. 6(b) shows the tilt adjustment mechanism with the upper housing 11 in the full up position with a one-way bearing clutch spring clip bushing. FIG. 6(c) shows the tilt adjustment mechanism with the upper housing 11 in the full up position with a spring clutch cork washer bushing. Operation will be described with respect to FIG. 6(a) but, is also applicable to embodiments shown in FIG. 6(b) and FIG. 6(c) with the exception that the shaft assemblies operate as described above. To rotate the housing downward, the operator pushes down on the upper housing as shown by direction arrow 73. The shaft 19 and gears (17A, 17B) prevent the housing from twisting and the upper housing moves down evenly. As force is exerted downward on the upper housing 11 or display tablet, the internal gears (23A, 23B) on the upper housing activate the gears (17A, 17B) on the end of the shaft. The wrap spring clutch 35 wraps down on the bushing 31 and turns the bushing within the spring clip 37. The spring clip 37 provides the load to prevent the upper housing 11 from moving downward with less than a predetermined load on the upper housing 11. The spring clutch 35 locks down on the shaft 19 as the shaft 19 starts to turn. The spring clutch 35 transmits the torque to the spring clip 37. The spring clip 37 provides the load to prevent the housing from moving downward with less than a predetermined load on the upper housing 11 when the predetermined force is exceeded.

Figure 8A:
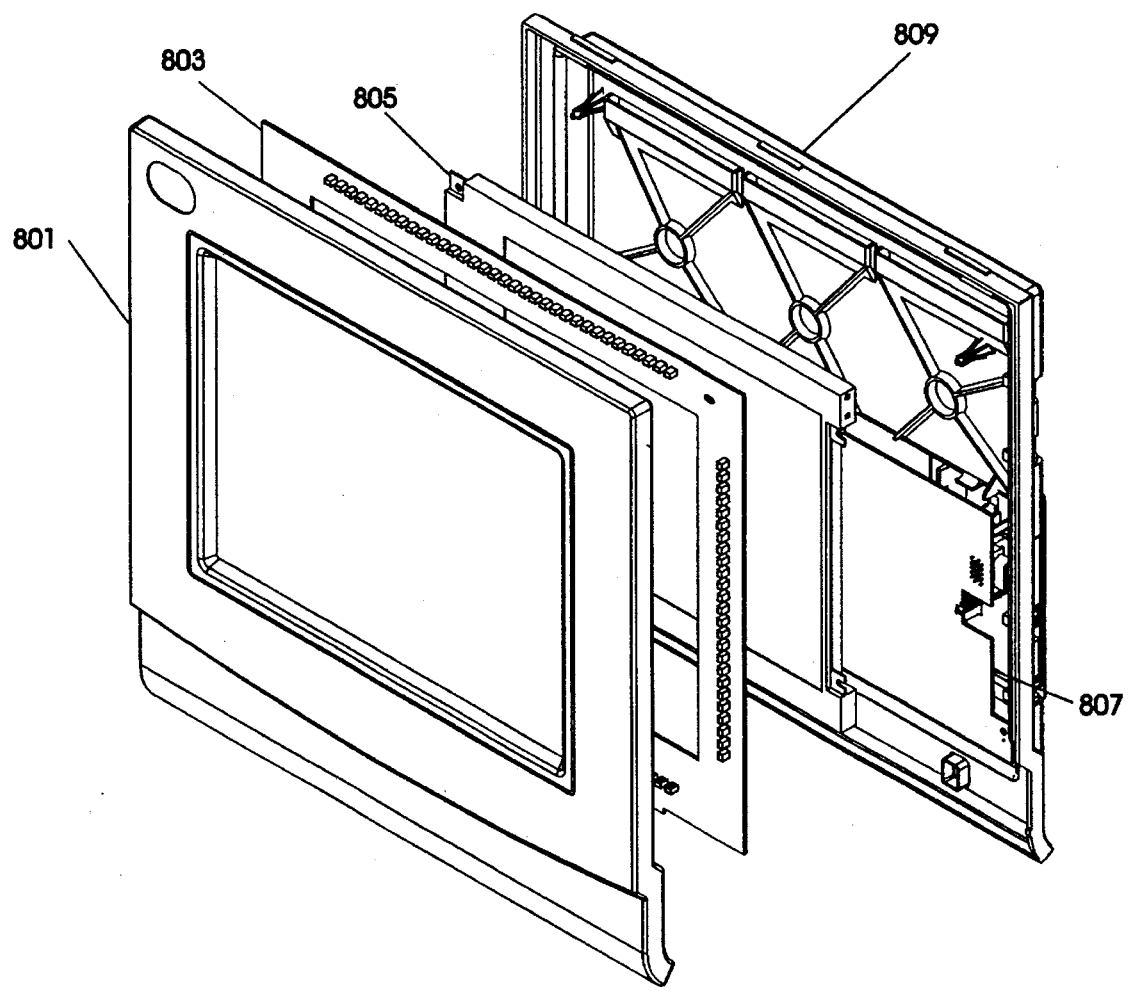
FIG. 8(a) is an exploded front view of a display tablet.
Figure 8B:
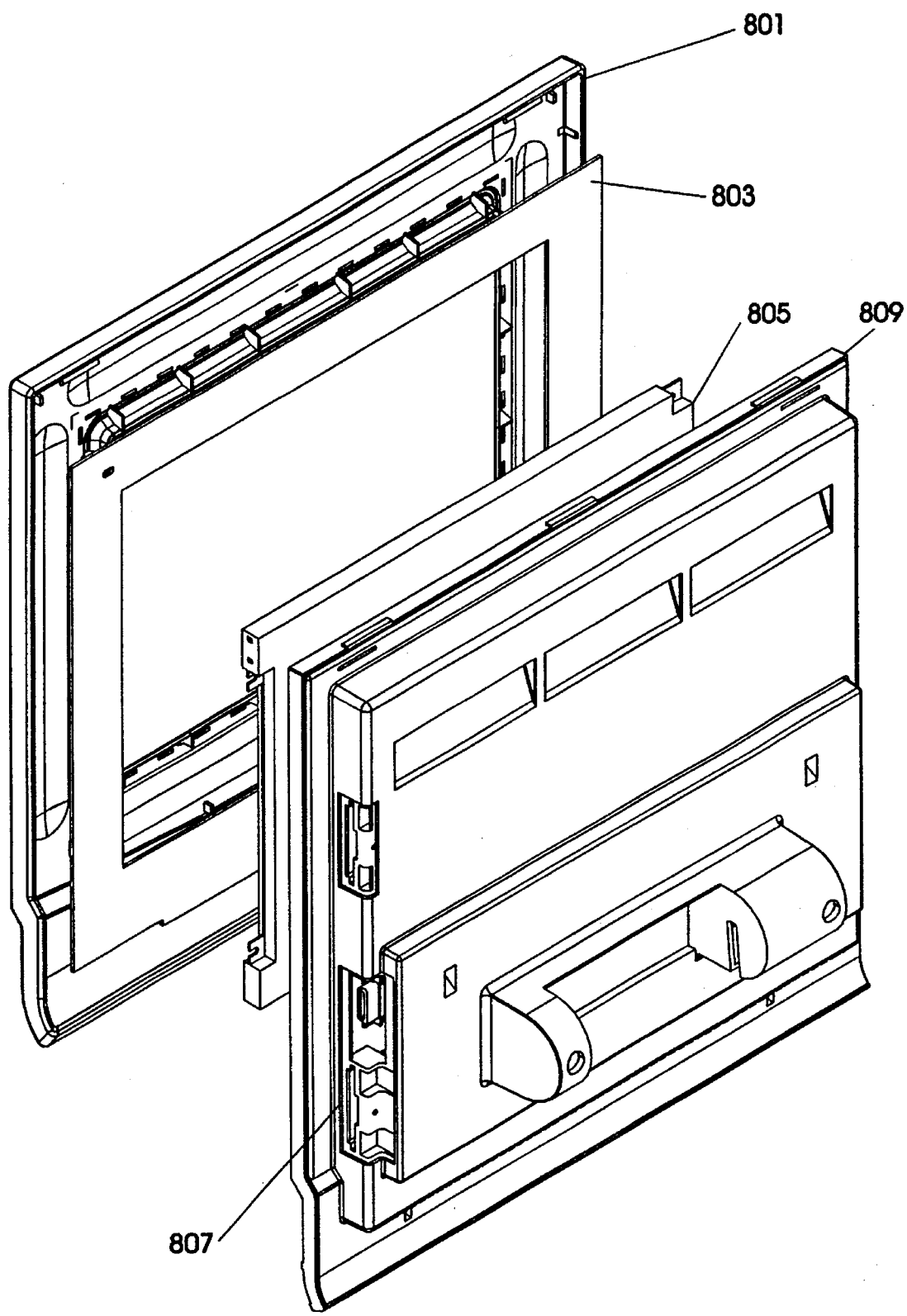
FIG. 8(b) is an exploded rear view of a display tablet.

The upper housing preferably contains elements that permit the tablet including the touch sensitive electronics and the display to be easily mounted. Elements 41, 43, 45, 47 of the upper housing 11 are used to support and attach the tablet to the tilt adjustment mechanism. Note the tab mechanism that allows the display tablet to be mated to that tilt adjustment mechanism so that it is easily attached and easily removed. FIG. 8(a) and FIG. 8(b) show exploded rear and front views respectively of a tablet that is suitable for mounting on the tilt adjustment mechanism. Note the front cover 801, touch ring 803, LCD assembly 805, card assembly 807 and rear cover 809. Note also the mating provided by the rear cover which permits the display tablet shown in FIG. 8 to be mounted on the tilt adjustment mechanism.

The touch ring 803 has one side and the top with photo receivers which are sensitive to infrared light. The other side and the bottom have the photo transmitters. It is not important which side has the transmitters or receivers but it is better for the top to have the receivers so sunlight will have greater difficulty getting to the receivers. The LCD Assembly 805 can be any flat panel display. This includes use active or passive LCDs, electro-luminescent or plasma, or any other flat display. Any of the following LCDs available from Sharp: LM64P89 (10.4" STN monochrome), LM64C15P (9.5" STN color) and LM64C35P (10.4" STN color) are suitable for use. The touch controller 807 provides contains one or more mircocontrollers that provide multiple functions. The touch controller 807 provides an interface between the touch ring and a microcontroller. In the preferred embodiment this is accomplished using ASIC and a masked 80C52 chips available from Carroll Touch, INC. The touch controller 807 may also provide a magnetic stripe reader interface connecting the MSR (housed in plastic) directly to the main microcontroller (80C452). The touch controller 807 may also provide cash drawer control and sensing the state of the cash drawer (open, closed or not present). The touch controller also generates the voltages required by the LCD Assembly 805 such as software controlled contrast voltage, power sequencing signals and LCD supply voltage and also provides the interfaces signals (clocks & data), which while not generated by the touch controller 807 are filtered by the touch controller 807 for EMC purposes.

Figure 9A:
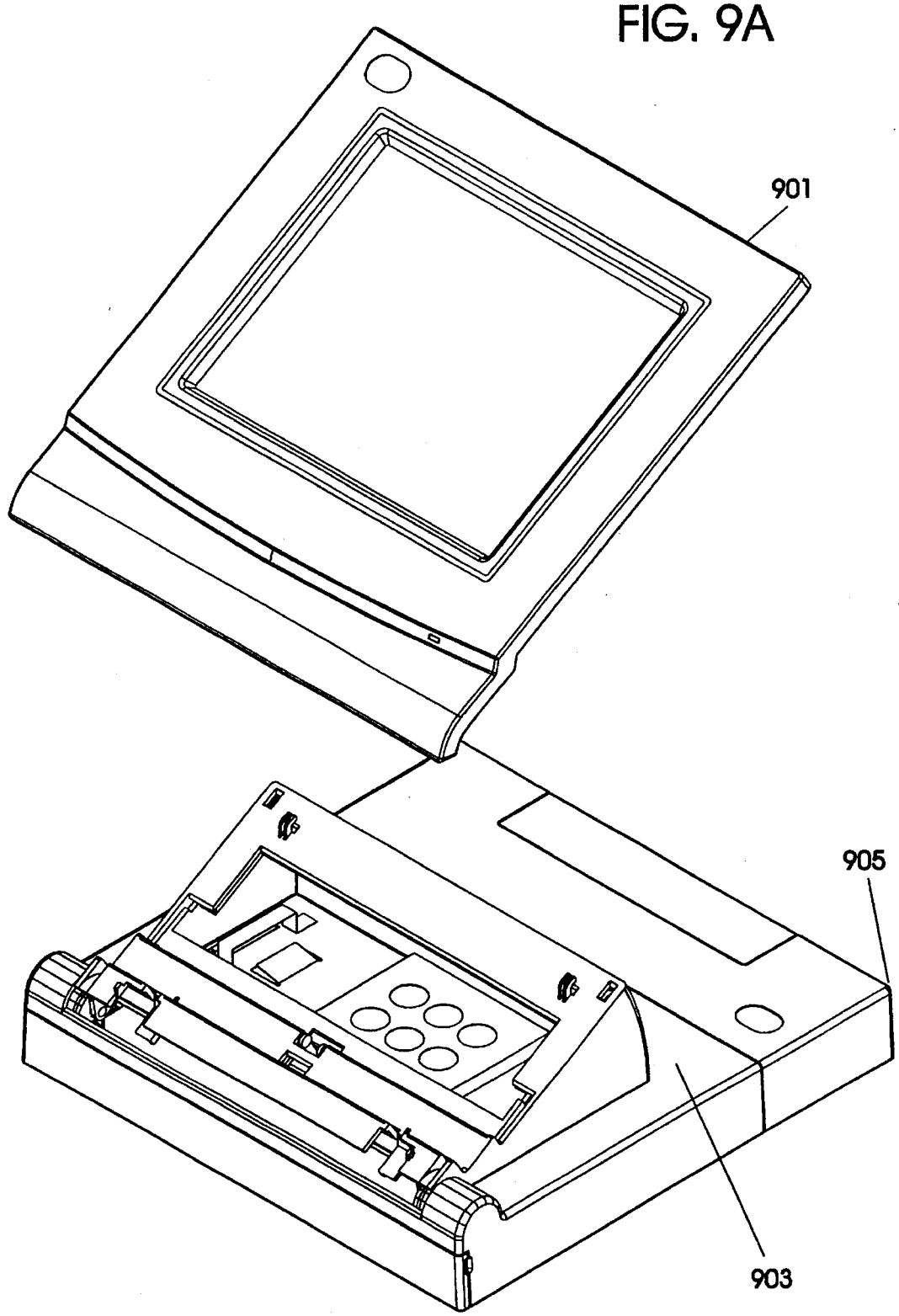
FIG. 9(a) is an exploded view of an assembled computer system having a tilt adjustment mechanism, display tablet and system unit.
Figure 9B:
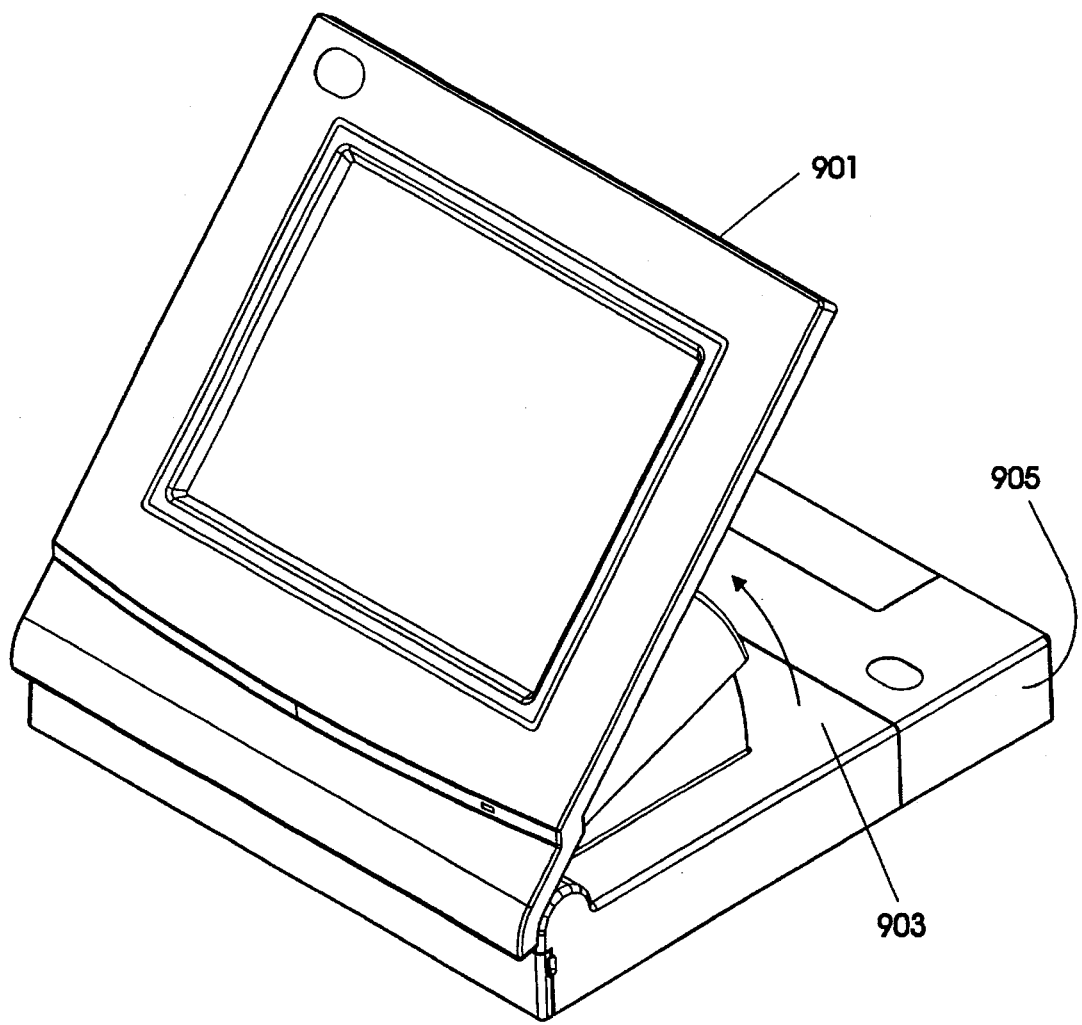
FIG. 9(b) is an assembled computer system having a tilt adjustment mechanism, display tablet and system unit with the display tablet in the full up position.
Figure 9C:
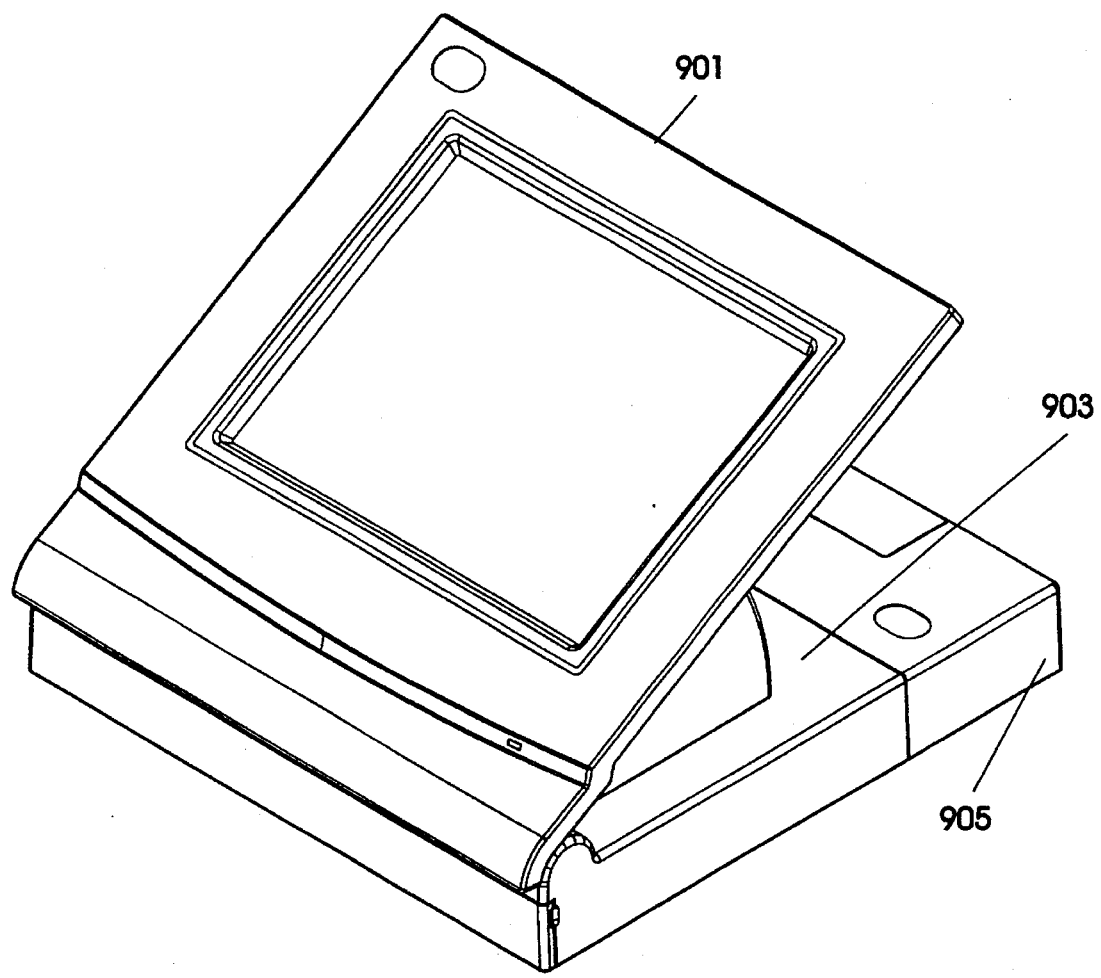
FIG. 9(c) is an assembled computer system having a tilt adjustment mechanism, display tablet and system unit with the display tablet in the full down position.

The lower housing may contain elements that permit the tilt adjustment mechanism to be easily mounted on a surface such as a counter top or a system unit or other object. An exploded view FIG. 9(a), a full down view FIG. 9(b), and a full up view FIG. 9(c) of a complete system containing a display tablet 901, a tilt adjustment mechanism 903 and a system unit 905 is shown in FIG. 9. Note that the lower housing is part of the cover for the system unit.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A tilt adjustment mechanism comprising:

a lower housing having support for seating a shaft assembly, said lower housing having a hinge post receptacle;

said shaft assembly having a shaft, a first gear and a second gear, mounted on said shaft, said shaft having a first resistance when rotated in a rotational direction and a second resistance when rotated an opposite rotational direction, an upper housing having hinge posts for hinging said lower housing to said upper housing, said upper housing having a first internal gear for receiving said first gear and a second internal gear for receiving said second gear, said internal gears activating said gears to rotate said shaft in the rotational direction when a downward force is applied to said upper housing with said upper housing rotating with respect to said lower housing about said hinge posts and to rotate said shaft and upper housing in the opposite rotational direction when an upward force is applied to said upper housing wherein said downward force must exceed said first resistance and said upward force must exceed said second resistance in order for the upper housing to move.

2. A tilt adjustment mechanism according to claim 1 wherein:

said first resistance is near zero pounds of force and said second resistance is near five pounds.

3. A tilt adjustment mechanism according to claim 2 wherein:

said shaft is a cylindrical shaft having a first end and a second end, each end having a smaller diameter portion; and said upper housing contains a first guide and a second guide, for receiving said first and second end respectfully.

4. A tilt adjustment mechanism according to claim 3 wherein each end of said shaft has a flat portion for mechanically locking each gear such that each gear rotates with the shaft.

5. The tilt adjustment mechanism of claim 4 wherein said upper housing moves in a 20 degree range with respect to the lower housing.

6. The tilt adjustment mechanism of claim 4 wherein the upper housing and the lower housing is comprised of a polycarbonate material.

7. The tilt adjustment mechanism of claim 6 where in the first gear and the second gear are made of carbon filled plastic.

8. The tilt adjustment mechanism of claim 6 where in the first gear and the second gear are made of TEFLON filled plastic.

9. The tilt adjustment mechanism of claim 1 wherein the shaft assembly further comprises:

a cylindrical shaft having a first end and a second end, each end having a smaller diameter portion for use in a guide of the tilt adjustment, each end having a flat portion for mechanically locking the gears to each end such that each gear rotates with the shaft;

a bushing having an outer surface and an inner surface with a one way bearing clutch pressed into the inner surface, said one way bearing clutch for receiving said shaft permitting the shaft to turn freely in the rotational direction and mechanically locking said shaft and said bushing when said shaft is turned in the opposite rotational direction; and a spring clip having a clip portion for attaching to said lower housing, the spring clip having a sleeve for receiving the bushing, said sleeve permitting said bushing to rotate in said sleeve when the second resistance between said bushing and said sleeve is overcome when said shaft and said bushing are turned in the opposite rotational direction.

10. The tilt adjustment mechanism of claim 1 wherein the shaft assembly further comprises:

a cylindrical shaft having a first end and a second end, each end having a smaller diameter portion for use in a guide of the tilt adjustment mechanism, each end having a flat portion for mechanically locking each gear to each end such that each gear rotates with the shaft, said shaft having an end clip and a notch, said notch having a c-clip seated therein;

a bushing on said shaft between said c-clip and said end clip having a wrap spring disposed between said bushing and said end clip, said wrap spring permitting the shaft to turn freely in the rotational direction and mechanically locking said shaft and said bushing when said shaft is turned in the opposite rotational direction; and a spring clip having a clip portion for attaching to said lower housing, the spring clip having a sleeve for receiving the bushing, said sleeve permitting said bushing to rotate in said sleeve when the second resistance between said bushing and said sleeve is overcome when said shaft and said bushing are turned in the opposite rotational direction.

11. The tilt adjustment mechanism of claim 1 wherein the shaft assembly further comprises:

a cylindrical shaft having a main body portion, a first end and a second end, each end having a smaller diameter than the main body portion for use in a guide of the tilt adjustment mechanism, each end having a flat portion for mechanically locking a gear to each end such that each gear rotates with the shaft, said shaft having an end clip and a notch, said notch having a shaft c-clip seated therein wherein said end clip and said shaft c-clip turn with said shaft;

a bushing having a first portion for receiving a wrap spring, a second portion for receiving a plurality of drag arm assemblies and a compression spring, a first shoulder located between said first and second portions, a notch in said second portion for receiving a bushing c-clip, said bushing located between said end clip and said shaft c-clip, said bushing having a wrap spring disposed between said first portion of said bushing and said end clip, said wrap spring permitting the shaft to turn freely in the rotational direction and mechanically locking said shaft and said bushing when said shaft is turned in the opposite rotational direction;

a plurality of drag arm assemblies located on said second portion of said bushing, each drag assembly having a first cork washer, a drag arm, a second cork washer, and a steel washer, each drag arm having a receptacle for receiving said second portion of said bushing, each drag arm having a hook portion for attaching to said lower housing, each steel washer having a tooth, said bushing having a groove in said second portion for receiving the tooth from each steel washer such that each steel washer rotates with the bushing when the second resistance between said steel washers and said drag arm assemblies is exceeded; and a compression spring disposed on said second portion of said bushing between said bushing c-clip and said drag assemblies for compressing said drag arm assemblies.

12. A tilt adjustment mechanism of claim 1 further comprising:

a display tablet mounted on said upper housing of said tilt adjustment mechanism.

* * * * *